United States Patent
Zhang et al.

(10) Patent No.: US 10,135,330 B2
(45) Date of Patent: Nov. 20, 2018

(54) CONTROL CIRCUIT AND CONTROL METHOD FOR A POWER CONVERTER

(71) Applicant: Silergy Semiconductor Technology (Hangzhou) LTD, Hangzhou, ZheJiang Province (CN)

(72) Inventors: Junming Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/668,008

(22) Filed: Aug. 3, 2017

(65) Prior Publication Data

US 2018/0041119 A1 Feb. 8, 2018

(30) Foreign Application Priority Data

Aug. 5, 2016 (CN) .......................... 2016 1 0648623

(51) Int. Cl.
    *H02M 1/42* (2007.01)
    *H02M 3/156* (2006.01)
    *H02M 1/00* (2006.01)

(52) U.S. Cl.
    CPC ....... *H02M 1/4225* (2013.01); *H02M 1/4258* (2013.01); *H02M 3/156* (2013.01); *H02M 2001/009* (2013.01); *H02M 2001/0025* (2013.01); *Y02B 70/126* (2013.01)

(58) Field of Classification Search
    CPC .......... H02M 2001/0009; H02M 1/42; H02M 1/4208; H02M 1/4225; H02M 3/156; H02M 3/157

USPC .......... 323/222, 282, 283, 285, 299; 363/89
See application file for complete search history.

(56) References Cited

U.S. PATENT DOCUMENTS

| | | | |
|---|---|---|---|
| 5,291,119 A * | 3/1994 | Cowett, Jr. | H02M 1/4208 323/207 |
| 6,259,613 B1 * | 7/2001 | Lee | G05F 1/70 323/222 |
| 7,183,753 B2 | 2/2007 | Tsuruya | |
| 7,514,912 B2 * | 4/2009 | Shao | H02M 1/4225 323/207 |
| 8,115,402 B2 | 2/2012 | Kuang et al. | |
| 9,054,592 B2 | 6/2015 | Yao et al. | |
| 9,054,597 B2 | 6/2015 | Zhao et al. | |
| 9,287,793 B2 | 3/2016 | Zhang et al. | |
| 9,391,511 B2 | 7/2016 | Yu et al. | |
| 9,577,533 B2 | 2/2017 | Yu et al. | |
| 2011/0084677 A1 | 4/2011 | Sji et al. | |
| 2012/0112795 A1 | 5/2012 | Wang et al. | |
| 2015/0117074 A1 * | 4/2015 | Miao | H02M 1/4225 363/44 |
| 2015/0146458 A1 * | 5/2015 | Lim | H02M 3/158 363/44 |

(Continued)

*Primary Examiner* — Nguyen Tran
(74) *Attorney, Agent, or Firm* — Michael C. Stephens, Jr.

(57) ABSTRACT

A control circuit for a power converter can include: a current detection circuit configured to generate a current detection signal that represents an input current; a control signal generator configured to generate a switching control signal such that the current detection signal is directly proportional to a voltage conversion function; and a power stage circuit of the power converter being controlled by the switching control signal, where the voltage conversion function is a ratio of an input voltage and an output voltage of the power converter.

20 Claims, 15 Drawing Sheets

(56) References Cited

U.S. PATENT DOCUMENTS

2016/0295648 A1* 10/2016 Wang ................. H05B 33/0845

* cited by examiner

CONTROL CIRCUIT AND CONTROL METHOD FOR A POWER CONVERTER

This application claims the benefit of Chinese Patent Application No. 201610648623.9, filed on Aug. 5, 2016, which is incorporated herein by reference in its entirety.

FIELD OF THE INVENTION

The present invention generally relates to the field of power electronics, and more particularly to control circuits and methods, and associated power converters.

BACKGROUND

The power factor (PF) is defined as the ratio of the actual output power to the apparent power of the power supply. The power factor PF is usually desired to be 1 in the design of a power supply circuit. A power factor correction (PFC) circuit may be applied in various voltage/power devices in order to control an input sinusoidal current and an input voltage to be in phase, such that the power factor is close to 1. However, some power converters with PFC circuits may only suitable for particular operation modes. For example, a Constant ON Time (COT) power converter can be operated in a Discontinuous Conduction Mode (DCM) and a Boundary Conduction Mode (BCM) to realize power factor correction, but not in a Continuous Conduction Mode (Continuous Conduction Mode).

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a control circuit for a power converter can include: (i) a current detection circuit configured to generate a current detection signal that represents an input current; (ii) a control signal generator configured to generate a switching control signal such that the current detection signal is directly proportional to a voltage conversion function; and (iii) a power stage circuit of the power converter being controlled by the switching control signal, where the voltage conversion function is a ratio of an input voltage and an output voltage of the power converter.

Figure 1A:
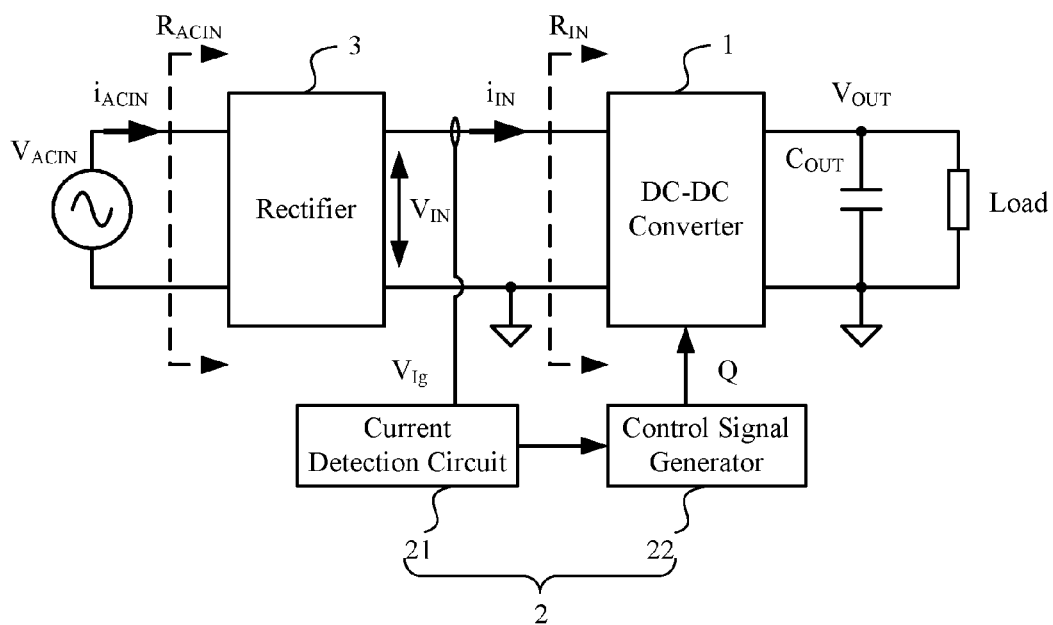
FIG. 1A is a schematic block diagram of an example power converter, in accordance with embodiments of the present invention.

Referring now to FIG. 1A, shown is a schematic block diagram of an example power converter, in accordance with embodiments of the present invention. In this particular example, the power converter can include DC-DC converter 1, control circuit 2, and rectifier 3. Rectifier 3 and DC-DC converter 1 can be coupled in series between an input port and an output port. AC voltage $V_{ACIN}$ and AC current $i_{ACIN}$ may be provided into the input port. Rectifier 3 can output DC voltage $V_{IN}$ and DC current $i_{IN}$ as an input of a following stage circuit (e.g., DC-DC converter 1). Control circuit 2 can realize a constant resistance control of DC-DC converter 1. That is, an input resistance may be equivalent to a resistor by power factor correction (PFC) control. When the constant resistance control of DC-DC converter 1 is realized, input resistance $R_{ACIN}$ of the entire power converter may be equivalent to a resistor, such that the power factor is 1. Output capacitor $C_{OUT}$ can also be employed across output voltage $V_{OUT}$.

In this particular example, control circuit 2 can include current detection circuit 21 and control signal generator 22. Current detection circuit 21 can generate current detection signal $V_{Ig}$ that represents input current $V_{IN}$. Control signal generator 22 can generate switching control signal Q with an object of making current detection signal $V_{Ig}$ be proportional to voltage conversion function F(X). Switching control signal Q can control DC-DC converter 1. The voltage conversion function F(X) may be a ratio of input voltage $V_{IN}$ and output voltage VOUT, i.e., $F(X)=V_{IN}/V_{OUT}$. For a switching type power converter, the system function can be expressed as a function F(X) of switching control signal parameters.

Thus, the relationship of input voltage $V_{IN}$ and output voltage $V_{OUT}$ is $V_{IN}=F(X)*V_{OUT}$. F(X) can be obtained from derivation or analysis of the circuit parameters in the circuit design. For example, F(X) is a function of parameters related to switching control signal Q (e.g., on time $T_{ON}$, off time $T_{OFF}$ and time period $GT_{OFF}$ during which the inductor current decreases from a peak value to zero, and so on). Control signal generator 22 can select a general voltage conversion function in different operation modes (CCM, DCM or BCM) according to the topology of DC-DC converter 1. That is to say, different operation modes can correspond to a same voltage conversion function $F(X)=V_{IN}/V_{OUT}$. Thus, for the example circuit shown in FIG. 1A, input resistance $R_{ACIN}$ may satisfy as below in (1).

$$R_{ACIN}=V_{ACIN}/i_{ACIN}=V_{IN}/i_{IN}=F(X)*V_{OUT}/i_{IN} \qquad (1)$$

In order to make input resistance $R_{ACIN}$ be a constant resistor, only input current $i_{IN}$ may be controlled to be proportional to F(X), i.e., $i_{IN}=nF(X)$, where n is a fixed value. In this case, input resistance $R_{ACIN}$ satisfies, $R_{ACIN}=F(X)*V_{OUT}/[n*F(X)]=V_{OUT}/n$. For example, when the power converter requires a constant voltage output, feedback and compensation circuit 23 can be provided in control circuit 2. Feedback and compensation circuit 23 can obtain voltage compensation signal $V_C$ that represents an error between the output voltage and a reference voltage. In addition, control signal generator 22 can generate the switching control signal with an object of making current detection signal $V_{Ig}$ be directly proportional to a product of the voltage conversion function F(X) and voltage compensation signal $V_C$. As voltage compensation signal $V_C$ may form a voltage control closed loop to regulate output voltage $V_{OUT}$ to be a fixed value in the bandwidth range of the voltage control closed loop, and voltage compensation $V_C$ can change much slower than the power frequency input current, constant voltage control and PFC control may be realized on the basis of $i_{IN}=p*V_C*F(X)$.

Figure 1B:
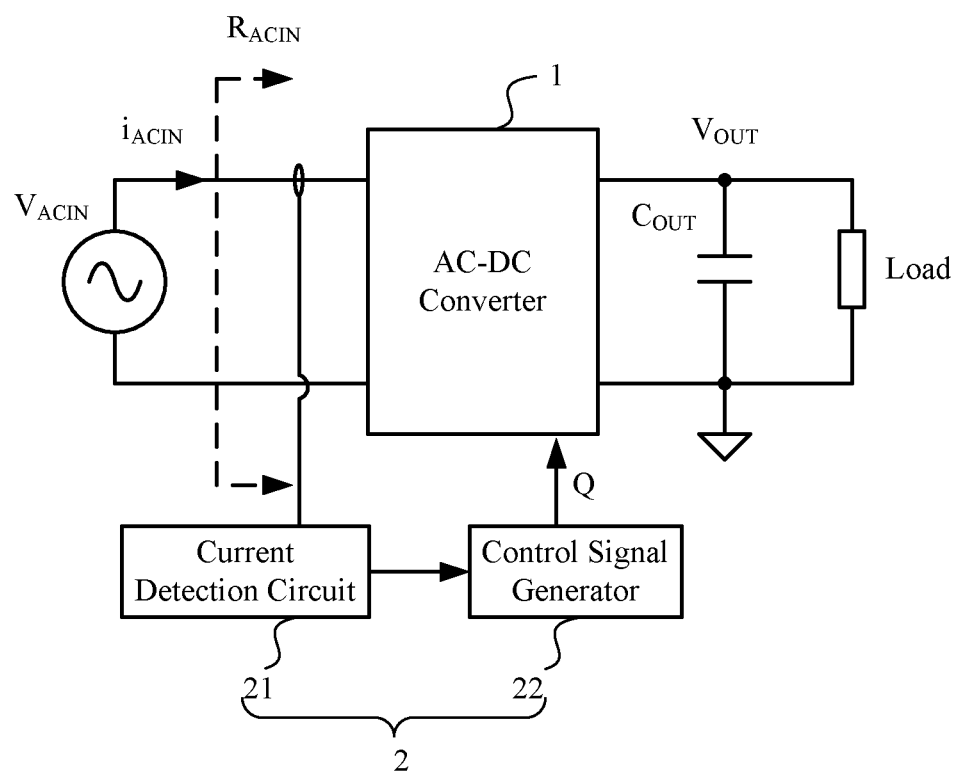
FIG. 1B is a schematic block diagram of another example power converter, in accordance with embodiments of the present invention.

Referring now to FIG. 1B, shown is a schematic block diagram of another example power converter, in accordance with embodiments of the present invention. The power converter of FIG. 1B can be a bridgeless AC-DC converter, with an input port for receiving the AC voltage $V_{ACIN}$ and AC current $i_{ACIN}$, and an output port for providing DC output voltage $V_{OUT}$. Output capacitor $C_{OUT}$ can also be employed. The input resistance may be equivalent to a resistor by the PFC control, such that the power factor will be 1. Similar to FIG. 1A, control circuit 2 can include current detection circuit 21 and control signal generator 22. Current detection circuit 21 can generate current detection signal $V_{Ig}$ that represents input current $I_{ACIN}$. Control signal generator 22 can generate switching control signal Q with an object of making the current detection signal be proportional to the voltage conversion function F(X).

Figure 2:
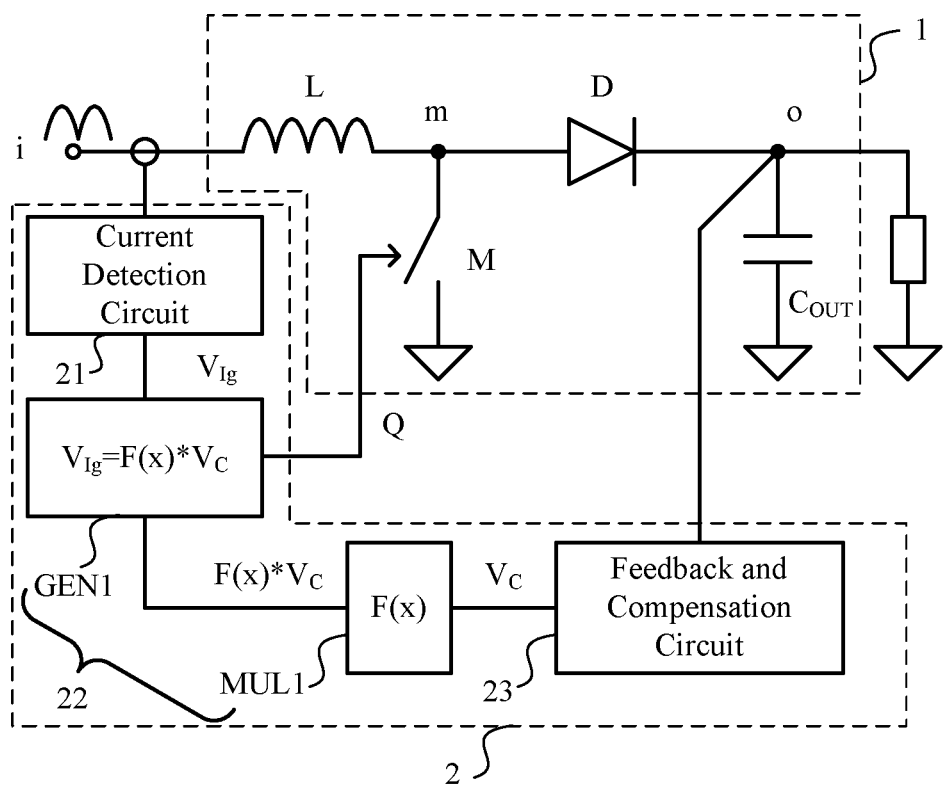
FIG. 2 is a schematic block diagram of yet another example power converter, in accordance with embodiments of the present invention.

The average value of the input current in one switching cycle may be proportional to the voltage conversion function that represents the ratio of the input voltage and the output voltage by controlling the switching operations of power switches. In this way, the entire power converter can be equivalent to a pure resistance in different operation modes (e.g., Continuous Conduction Mode, Boundary Conduction Mode, and Discontinuous Conduction Mode), such that the PF value is maintained as 1 or close to 1, which is conducive to power expansion and effectively suppresses harmonic ripples. Particular embodiments are also suitable for being controlled by fixed-frequency or quasi-fixed frequency control schemes, and for a single-phase power stage circuit or a multiphase power stage circuit with wide applicability. In particular embodiments, more compact circuit structures without sampling an input voltage can be provided, and may be suitable for any type of power converter. While a DC-DC converter of Boost topology is primarily described as an example herein, DC-DC converters of other types (e.g., buck topology, buck-boost topology, flyback topology, forward topology, etc.) or a bridgeless AC-DC power, can be employed in certain embodiments Referring now to FIG. 2, shown is a schematic block diagram of yet another example power converter, in accordance with embodiments of the present invention. In this particular example, the power converter can include Boost converter 1 and control circuit 2. Boost converter 1 can include inductor 1, power switch M, rectifier diode D, and output capacitor COUT. Inductor L may be coupled between an input terminal of Boost converter 1 and intermediate terminal m. Power switch M can be coupled between the intermediate terminal m and ground. Rectifier diode D may be coupled between intermediate terminal m and output terminal o. Output capacitor $C_{OUT}$ can be coupled between output terminal o and ground. Output terminal o may be coupled to a load. Alternatively, rectifier diode D can be replaced by a synchronous rectifier switch.

Control circuit 2 can include current detection circuit 21, control signal generator 22, and feedback and compensation circuit 23. Control signal generator 22 can include multiplication circuit MUL1 and generating circuit GEN1. Multiplication circuit MUL1 can output a product signal that represents a product of the voltage conversion function and the voltage compensation signal, for example, multiplication circuit MUL1 outputs Vc*F(X). Generating circuit GEN1 can receive the current detection signal $V_{Ig}$ and product signal $V_C*F(X)$, and may generate switching control signal Q such that current detection signal $V_{Ig}$ equals the product signal, as shown in FIG. 2. Alternatively, current detection signal $V_{Ig}$ may be directly proportional to the product signal with a coefficient other than 1. It should be understood that, as described herein, "equal" means the coefficient is 1, i.e., a special case of directly proportion.

Control circuit 2 may form a voltage control loop including feedback and compensation circuit 23, multiplication circuit MUL1, and generating circuit GEN1, and a current loop including current detection circuit 21 and generating circuit GEN1. The output voltage of the power converter can change much slower than the input current. Thus, constant voltage control and PFC control can be realized in a relatively short time period. In addition, feedback and compensation circuit 23 can be omitted in cases that do not require the constant voltage output.

Figure 3:
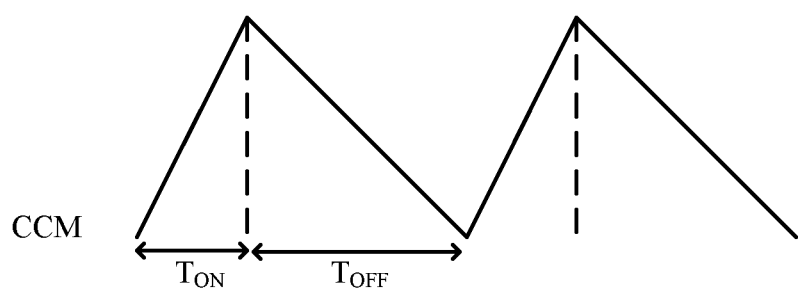
FIG. 3 is a waveform diagram of example operation of the power converter of FIG. 2 in CCM mode, in accordance with embodiments of the present invention.

Referring now to FIG. 3, shown is a waveform diagram of example operation of the power converter of FIG. 2 in CCM mode, in accordance with embodiments of the present invention. The following further explains the operation principle of the circuit of FIG. 2 in conjunction with drawings. In this particular example, for a Boost converter, in CCM mode, the inductor current may rise during on time $T_{ON}$ of the power switch, and can continuously decrease to the lowest value during off time $T_{OFF}$ of the power switch, and then may start a next cycle. The input voltage and the output voltage can satisfy the following approximate relationship (2) based on the volt-current balance of the inductor current.

$$V_{IN} * T_{ON} = (V_{OUT} - V_{IN}) * T_{OFF} \qquad (2)$$

Furthermore, $V_{IN} = V_{OUT} * T_{OFF}/(T_{ON} + T_{OFF})$. Since BCM mode is similar to CCM mode except for the inductor current is decreased to zero at the end of a switching cycle, the above formula can also be used to analyze the relationship between the input voltage and the output voltage in BCM mode.

Figure 4:
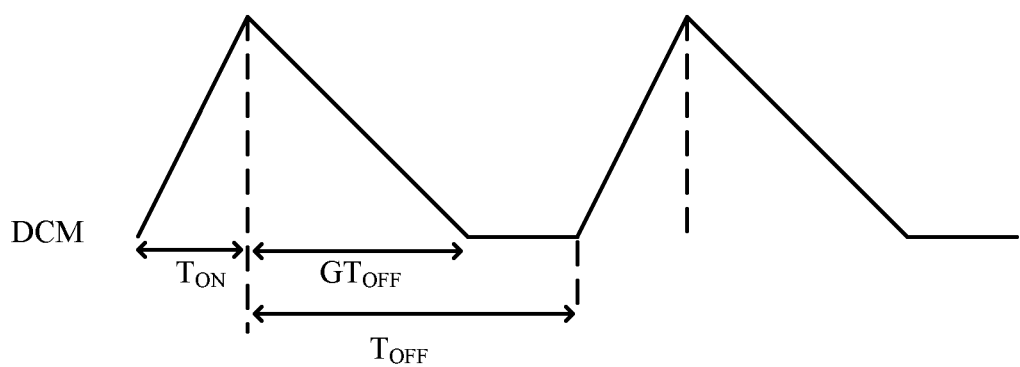
FIG. 4 is a waveform diagram of example operation of the power converter of FIG. 2 in DCM mode, in accordance with embodiments of the present invention.

Referring now to FIG. 4, shown is a waveform diagram of example operation of the power converter of FIG. 2 in DCM mode, in accordance with embodiments of the present invention. In this particular example, for a Boost converter in DCM mode, the inductor current can rise during on time $T_{ON}$ of the power switch, and may continuously decrease to zero during off time $T_{OFF}$ of the power switch, and then can remain at zero until the next cycle starts. The time period during which the inductor current is decreased from the peak value to zero is denoted as $GT_{OFF}$ in FIG. 4. The input voltage and the output voltage may satisfy the following relationship (3) and (4) based on the volt-current balance of the inductor current.

$$V_{IN} * T_{ON} = (V_{OUT} - V_{IN}) * GT_{OFF} \qquad (3)$$

Furthermore, $V_{IN} = V_{OUT} * GT_{OFF}/(T_{ON} + GT_{OFF})$. $\qquad (4)$

It can be known from the analysis of the above two cases that, for the change in the inductor current, CCM mode and BCM mode can both be considered as special cases of DCM mode. That is, in the CCM mode, it can be understood as $GT_{OFF} = T_{OFF}$. Thus, each switching cycle may be divided into on time $T_{ON}$ and off time $T_{OFF}$ of the switching control signal. Off time $T_{OFF}$ can include a time period $GT_{OFF}$ starting from a moment that the switching control signal is switched to off state to a moment that the inductor current is decreased to zero (e.g., the time period during which the inductor current decreases from the peak value to zero). The time period can be controlled by sampling the zero-crossing point and the peak value of the inductor current or the switching control signal. The zero-crossing detection of the inductor current can be realized by current detection circuit 21. In CCM mode, $GT_{OFF} = T_{OFF}$. Thus, the voltage conversion function F(X) in three operation modes may further be analyzed on the basis of the above formulas. Substituting $V_{IN} = V_{OUT} * GT_{OFF}/(T_{ON} + GT_{OFF})$ into $R_{IN} = V_{IN}/i_{IN}$, as provided below in (5).

$$R_{IN} = \frac{V_{OUT} \cdot GT_{OFF}}{(T_{ON} + GT_{OFF}) \cdot i_{IN}} \qquad (5)$$

In this way, if input resistance RIN is desired to be a constant value, $i_{IN}$ should be in direct proportion to $F(X) = GT_{OFF}/(T_{ON} + GT_{OFF})$. In this particular example, current detection signal $V_{Ig}$ may represent the average value of inductor current iL in a switching cycle, thus as shown below in (6).

$$R_{IN} = \frac{V_{IN}}{V_{Ig}} = \frac{V_{OUT} \cdot \frac{GT_{OFF}}{T_{ON} + GT_{OFF}}}{V_{Ig}} \qquad (6)$$

From the above formula, input resistance $R_{IN}$ may be controlled to be a constant rational number as long as switching control signal Q controls current detection signal $V_{Ig}$ to be in direct proportion to product signal $V_C * F(X)$. Thus, generating circuit GEN1 can accordingly generate switching control signal Q to form a closed loop for PFC control.

Figure 5:
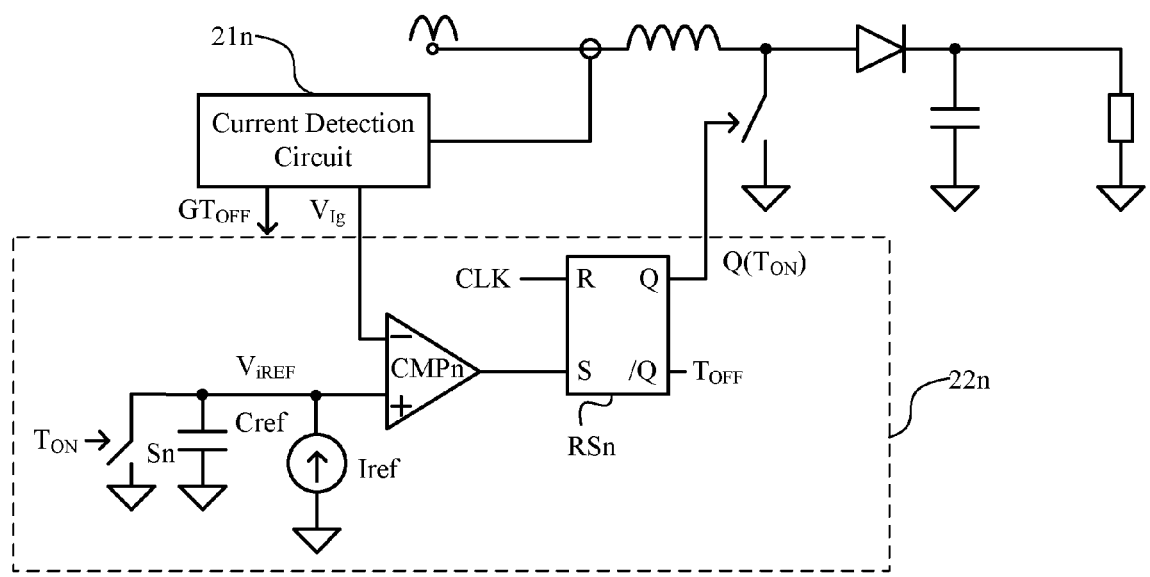
FIG. 5 is a schematic block diagram of an example current control loop in a power converter, in accordance with embodiments of the present invention.

Referring now to FIG. 5, shown is a schematic block diagram of an example current control loop in a power converter, in accordance with embodiments of the present invention. In this particular example, the control circuit can include current detection circuit 21n and control signal generator 22n. Current detection circuit 21n can output current detection signal $V_{Ig}$ that represents the input current, for example, a value obtained at the sampling time or an average value obtained in a time period. Control signal generator 22n can include switch Sn, capacitor Cref, current source Iref, comparator CMPn, and RS flip-flop RSn. Switch Sn can conduct during the on time of the power switch (e.g., the switch Sn can be controlled by switching control signal Q).

Switch Sn, capacitor Cref and current source Iref can be coupled in parallel between a non-inverting input terminal of comparator CMPn and ground. When switch Sn is turned off, current source Iref can charge capacitor Cref, and voltage $V_{iREF}$ at the non-inverting input terminal may continuously rise. When switch Sn is turned on, capacitor Cref can be discharged, so voltage $V_{iREF}$ at the non-inverting input terminal may rapidly decrease to zero. An inverting input terminal of comparator CMPn can receive current detection signal $V_{Ig}$. When RS flip-flop RSn is reset by clock signal CLK, switching control signal Q can be switched to off state. Also, switch Sn may be turned off, and voltage $V_{iREF}$ at the non-inverting input terminal of comparator CMPn can begin to increase. When voltage $V_{iREF}$ gets larger than current detection signal $V_{Ig}$, the output of comparator CMPn can go, RS flip-flop RSn may be set, and switching control signal Q can be switched to the on state.

Off time TOFF of switching control signal Q can be decided by current detection signal $V_{Ig}$, current source Iref, and capacitor Cref. The current control loop of FIG. 5 can make current detection signal $V_{Ig}$ (e.g., the average value in a switching cycle which is in direct proportion to the input current) be equal to peak voltage $V_{iREF}$ at the non-inverting input terminal of comparator CMPn. The average value in a switching cycle that represents the input current (e.g., the inductor current) may remain constant. In this example, the peak value of the voltage at the non-inverting input terminal of comparator CMPn may satisfy as below in (7).

$$V_{iREF} = \frac{Iref \cdot T_{OFF}}{Cref} \qquad (7)$$

Because $V_{Ig} = V_{iREF}$, the input resistance can satisfy as below in (8).

$$R_{IN} = \frac{V_{IN}}{V_{Ig}} = \frac{V_{OUT} \cdot \frac{GT_{OFF}}{T_{ON} + GT_{OFF}}}{Iref \cdot \frac{T_{OFF}}{Cref}} = \frac{V_{OUT} \cdot Cref}{Iref} \cdot \frac{\frac{GT_{OFF}}{T_{ON} + GT_{OFF}}}{T_{OFF}} \qquad (8)$$

For example, when constant voltage output is also required, current source Iref can be set as a voltage controlled current source under the control of voltage compensation signal $V_C$, in order to introduce a voltage control loop for constant voltage control. In such a case, the current source Iref can satisfy: $i=gm*V_C$, where gm is an amplification factor of a controlled current source, and furthermore, as can be seen below in (9).

$$R_{IN} = \frac{V_{OUT} * Cref}{gm * V_C} \cdot \frac{GT_{OFF}}{T_{OFF}} \frac{T_{ON} + GT_{OFF}}{T_{OFF}} \quad (9)$$

Gain K can be introduced to voltage compensation signal $V_C$, as can be seen below in (10).

$$R_{IN} = \frac{V_{OUT} * Cref}{gm * K * V_C} \cdot \frac{GT_{OFF}}{T_{OFF}} \frac{T_{ON} + GT_{OFF}}{T_{OFF}} \quad (10)$$

Since the constant voltage control is introduced, output voltage $V_{OUT}$ may be a fixed value in a bandwidth frequency range of the current control loop. Thus, voltage compensation signal $V_C$ may also be a fixed value. When the capacitance value of capacitor Cref is constant, if $$K = \frac{GT_{OFF}}{(T_{ON} + GT_{OFF}) \cdot T_{OFF}},$$

the input resistance can be shown as a constant resistance, so that the PF value may be controlled as 1. In this way, on the basis of the current control loop, the PFC control can be realized by adding a multiplication circuit with a coefficient of K between a control terminal of the voltage controlled current source and the feedback and compensation circuit.

Figure 6:
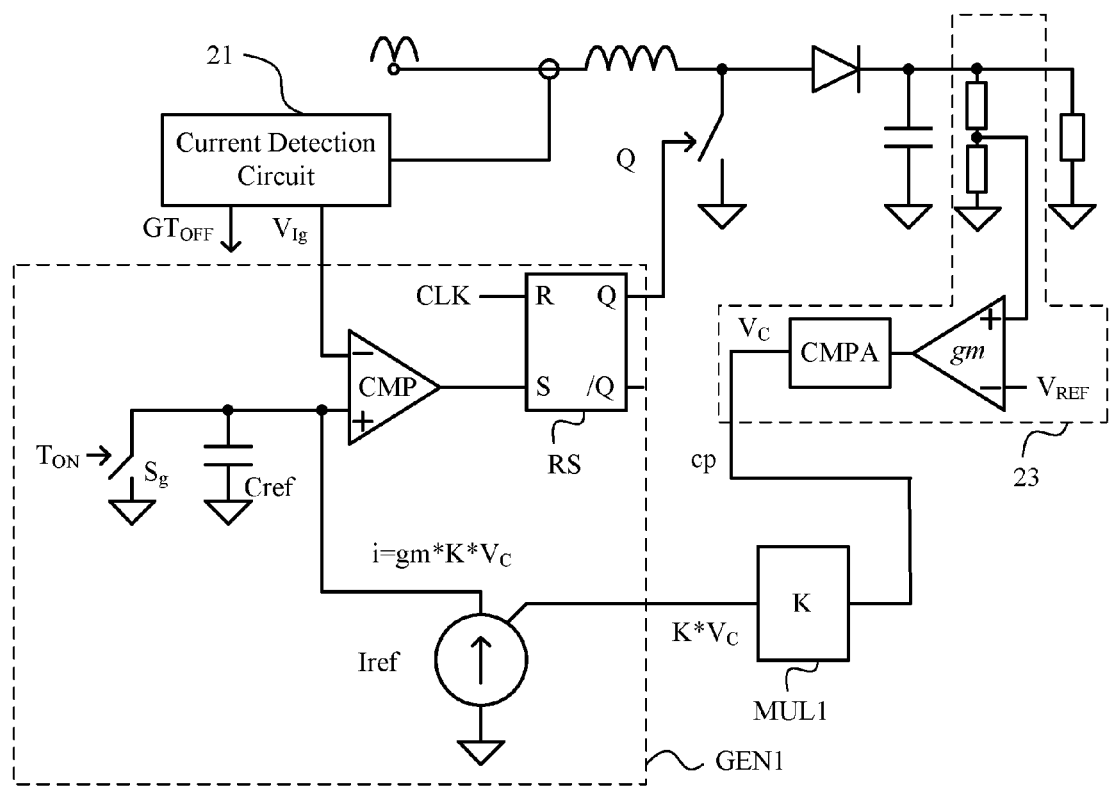
FIG. 6 is a schematic block diagram of an example power converter of FIG. 2, in accordance with embodiments of the present invention.

Referring now to FIG. 6, shown is a schematic block diagram of an example power converter of FIG. 2, in accordance with embodiments of the present invention. In this particular example, control circuit 2 can include current detection circuit 21, control signal generator 22, and feedback and compensation circuit 23. Feedback and compensation circuit 23 can include a voltage divider circuit, an error amplifier gm and a compensation circuit CMPA. The voltage divider circuit can divide output voltage $V_{OUT}$ and output a divided voltage to the error amplifier gm. Error amplifier gm can compare the feedback voltage and reference voltage VREF and output an amplified error signal, and may generate voltage compensation signal VC by compensation circuit CMPA. Control signal generator 22 can include multiplication circuit MUL1 and generating circuit GEN1. For example, generating circuit GEN1 can include switch Sg, capacitor Cref, controlled current source Iref, comparator CMP, and RS flip-flop RS. Multiplication circuit MUL1 can be coupled between a control terminal of controlled current source Iref and voltage compensation signal output terminal cp, for generating a voltage signal or a current signal being in direct proportion to $K*V_C$ (referred as a first product signal). For example, multiplication circuit MUL1 can generate the first product signal by controlling at least one switch according to the switching control signal.

Figure 7:
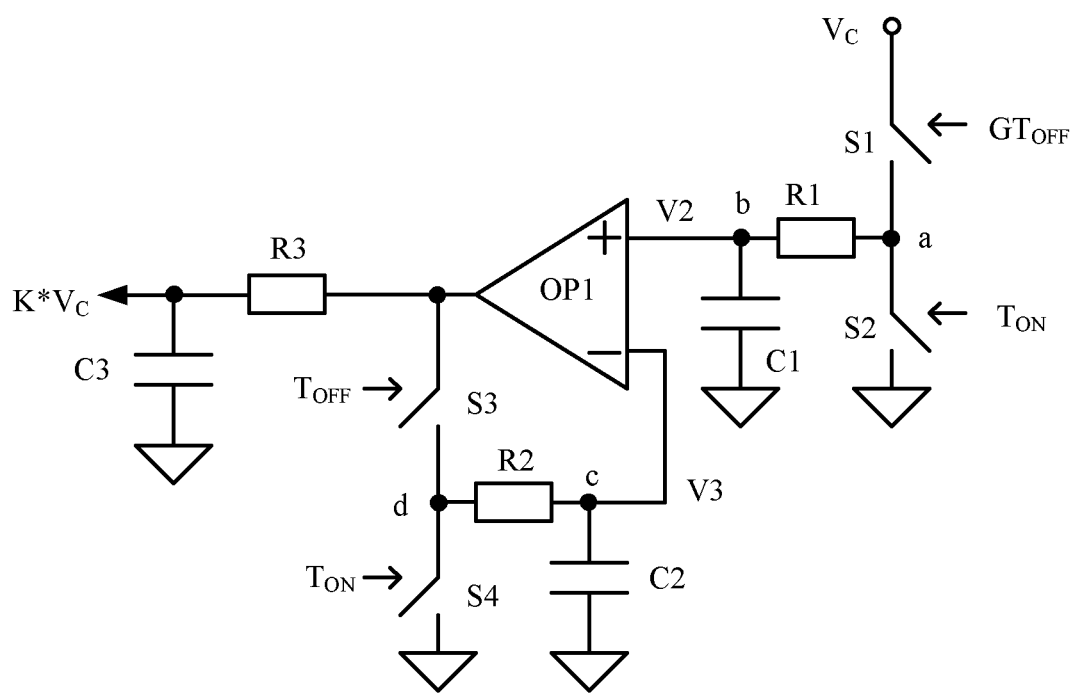
FIG. 7 is a schematic block diagram of an example multiplication circuit in FIG. 6, in accordance with embodiments of the present invention.

Referring now to FIG. 7, shown is a schematic block diagram of an example multiplication circuit in FIG. 6, in accordance with embodiments of the present invention. In this particular example, multiplication circuit MUL1 can include switches S1-S4, resistors R1-R3, capacitors C1-C3, and operational amplifier OP1. Switch S1 can be coupled between voltage compensation signal output terminal cp and terminal a. Switch S2 may be coupled between terminal a and ground. Resistor R1 can be coupled between the first terminal a and a second terminal b. Capacitor C1 can be coupled between terminal b and ground. Switches S1-S2, resistor R1, and capacitor C1 may form a first stage circuit of multiplication circuit MULL Switch S1 can be turned on during time period $GT_{OFF}$ that lasts from a moment that switching control signal Q is switched to off state to a moment that the inductor current is decreased to zero.

The control signal of switch S1 can be obtained by detecting the zero-crossing point of the input current by current detection circuit 21. Switch S2 can be turned on during on time $T_{ON}$ of switching control signal Q. When switch S1 is turned on, switch S2 can be turned off, and voltage VC at voltage compensation signal input terminal cp can charge capacitor C1 via the resistor R1. When switch S2 is turned on, switch S1 may be turned off, and capacitor C1 can be discharged via resistor R1. An RC circuit may be formed by resistor R1 and capacitor C1 to smooth the pulse input, such that the output of the first stage of the multiplication circuit can be a relatively smooth DC voltage and DC current with tiny ripple superposition components under the control of a continuous pulse width modulation signal. Voltage V2 may satisfy as below in (11).

$$V2 = V_C \cdot \frac{GT_{OFF}}{T_{ON} + GT_{OFF}} \quad (11)$$

The first stage of multiplication circuit MUL1 may have substantially the same circuit structure as a duty cycle generating circuit, which superimposes a function related to switching control signal parameters on the input signal by controlling the switches. Operational amplifier OP1, switches S3-S4, resistors R2-R3, and capacitors C2-C3 may form a second stage circuit of multiplication circuit MUL1 Operational amplifier OP1 may have a non-inverting input terminal coupled to terminal b, and an inverting input terminal coupled to terminal c. Switch S3 may be coupled between an output terminal of operational amplifier OP1 and terminal d. Switch S4 can be coupled between terminal d and ground. Switch S3 may be turned on during off time $T_{OFF}$ of switching control signal Q. Switch S4 may be turned on during on time $T_{ON}$ of the switching control signal Q. Resistor R2 can be coupled between terminal c and terminal d. Capacitor C2 may be coupled between the third terminal c and ground. Resistor R3 can be coupled between the output terminal of operational amplifier OP1 and a first product signal output terminal. Capacitor C3 can be coupled between the first product signal output terminal and ground.

The voltages at two input terminals of operational amplifier OP1 are the same, so a voltage V3 at terminal c can be equal to voltage V2 at terminal b. A feedback circuit formed by switches S3-S4, resistor R2, and capacitor C2 may have substantially the same structure as the first stage circuit of the multiplication circuit. The feedback circuit can be coupled between the output terminal and the inverting input terminal of operational amplifier OP1. The relationship between a voltage VOP at the output terminal of operational amplifier OP1 and voltage V2 at terminal b can satisfy as shown below in (12).

$$V2 = V_{OP} \cdot \frac{T_{off}}{T_{on} + T_{off}} \quad (12)$$

Furthermore, the relation as shown below in (13) can be satisfied.

$$V_{OP} = V2 \cdot \frac{T_{ON} + T_{off}}{T_{off}} = V_C \cdot \frac{GT_{off}}{T_{on} + GT_{off}} \cdot \frac{T_{ON} + T_{off}}{T_{off}} = \quad (13)$$
$$V_C \cdot \frac{GT_{OFF}}{(T_{ON} + GT_{OFF}) \cdot T_{OFF}} \cdot T_S = V_C \cdot K \cdot T_S$$

Here, $T_S = T_{OFF} + T_{ON}$ is a switching cycle. The switching cycle is fixed in this example. Voltage $V_{OP}$ at the output terminal of operational amplifier OP1 may be directly proportion to $K*V_C$. An RC circuit formed by resistor R3 and capacitor C3 can smooth voltage $V_{OP}$ at the output terminal of operational amplifier OP1 and output the first product signal.

In the above example, the generating circuit can receive a clock signal via the RS flip-flop to control the state switching of the switching control signal (e.g., switching from an on state to an off state). That is, the switching control signal in the above example may have a fixed switching cycle, such that the power converter operates by fixed-frequency control. However, particular embodiments are not limited to the control circuit with fixed switching cycles. In the circuit for generating the switching control signal by a quasi-fixed frequency control manner, because the switching cycles are fixed or approximately equal for most of the time, the PFC control can be realized by substantially the same manner. Also, an ON signal generator circuit can be employed as a quasi-fixed frequency signal generator to generate a quasi-fixed frequency signal. The quasi-fixed frequency signal may have fixed frequency in a time period. In such a case, the control signal generator can receive the quasi-fixed frequency signal to control the switching control signal to switch operations. Thus, the power switch can be controlled by an approximate fixed frequency manner without an inner clock signal generator.

The first product signal may be provided to the control terminal of controlled current source Iref of generating circuit GEN1, in order to generate a current signal in direct proportion to $K*V_C$. Generating circuit GEN1 can generate switching control signal Q with an object of making the current detection signal directly proportion to the current signal, and to realize constant voltage control and PFC control. Both of the CCM mode and BCM mode can be treated as special cases of DCM mode (e.g., $GT_{OFF} = T_{OFF}$ in CCM mode and BCM mode). Therefore, the solution as described herein may be suitable for all modes and can realize PFC control in all operation modes. In addition, power stage circuits of other topologies have different voltage conversion functions. In this case, a corresponding voltage conversion function can be selected according to the topology of the power stage circuit, in order to realize general PFC control for different topologies in different operation modes (e.g., CCM mode, BCM mode or DCM mode).

Figure 8:
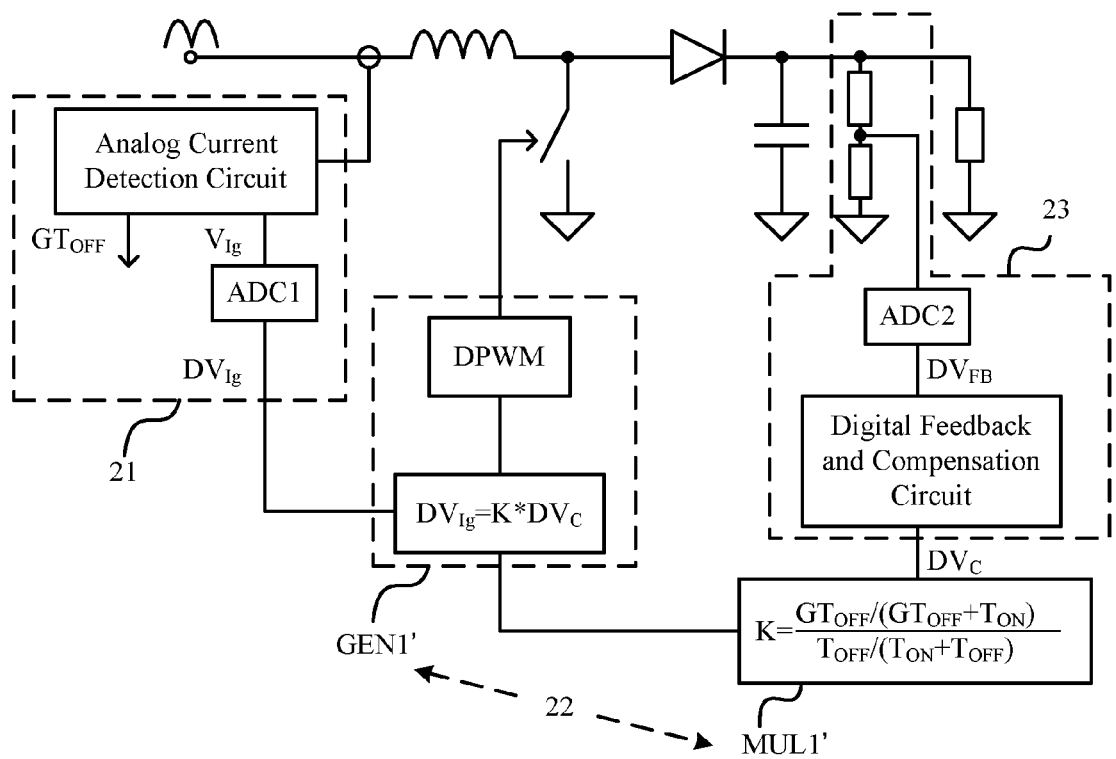
FIG. 8 is a schematic block diagram of another example power converter of FIG. 2, in accordance with embodiments of the present invention.

Referring now to FIG. 8, shown is a schematic block diagram of another example power converter of FIG. 2, in accordance with embodiments of the present invention. The control signal generator can be implemented by a digital circuit, and in this example, control circuit 2 can include current detection circuit 21, control signal generator 22, and feedback and compensation circuit 23. Current detection circuit 21 can include an analog current detection circuit and analog-to-digital conversion circuit ADC1. Analog-to-digital conversion circuit ADC1 can convert current detection signal $V_{Ig}$ of analog form into a digital signal $DV_{Ig}$. Feedback and compensation circuit 23 can include analog-to-digital conversion circuit ADC2, for converting feedback voltage $V_{FB}$ obtained by dividing operation to digital signal $DV_{FB}$, and then may output voltage compensation signal $DV_C$ in the form of digital signal through a digital feedback and compensation circuit.

Control signal generator 22 can include multiplication circuit MUL1' and generating circuit GEN1'. Multiplication circuit MUL1' can generate a product signal by multiplying voltage compensation signal $DV_C$ by coefficient K. Generating circuit GEN1' can receive digital current detection signal $DV_{Ig}$ and digital product signal $K*DV_C$, and generate switching control signal Q by digital pulse width modulation such that digital current detection signal $DV_{Ig}$ is equal to digital product signal $K*DV_C$ or proportional to digital product signal $K*DV_C$ with a coefficient other than 1. In one example implementation of generating the switching control signal by a digital manner, multiplication circuit MUL1' and generating circuit GEN1' in control signal generator 22 can be dedicated digital logic circuits. Alternatively, control signal generator 22 can be a general digital signal process circuit, multiplication circuit MUL1' and generating circuit GEN1' can be implemented by executing corresponding programs or function modules by a general digital signal process circuit.

The control signal generator can receive current detection signal $V_{Ig}$ and voltage conversion function $F(X)$, in order to directly generate the switching control signal such that $V_{Ig}$ is proportional to $F(X)$. On the other hand, voltage conversion function $F(X)$ can be decomposed into two parts. For example, $F(X)$ can be decomposed into $F_2(X)/F_1(X)$. The control signal generator can generate the switching control signal such that $V_{Ig}$ is proportional to $F(X)$ by initially multiplying the current detection signal $V_{Ig}$ with one portion of the voltage conversion function $F(X)$, and then by comparing with the other portion of voltage conversion function $F(X)$. That is, the switching control signal can be generated such that $V_{Ig}*F_1(X)$ is in direct proportion to $F_2(X)$. In addition, the control signal generator can generate the switching control signal such that $V_{Ig}/F(X)$ is a constant value or an approximate constant value. For example, voltage compensation signal $V_C$ can be generated by multiplying current detection signal $V_{Ig}$ by a reciprocal of voltage conversion function $F(X)$, i.e., $1/F(X)$.

Figure 9:
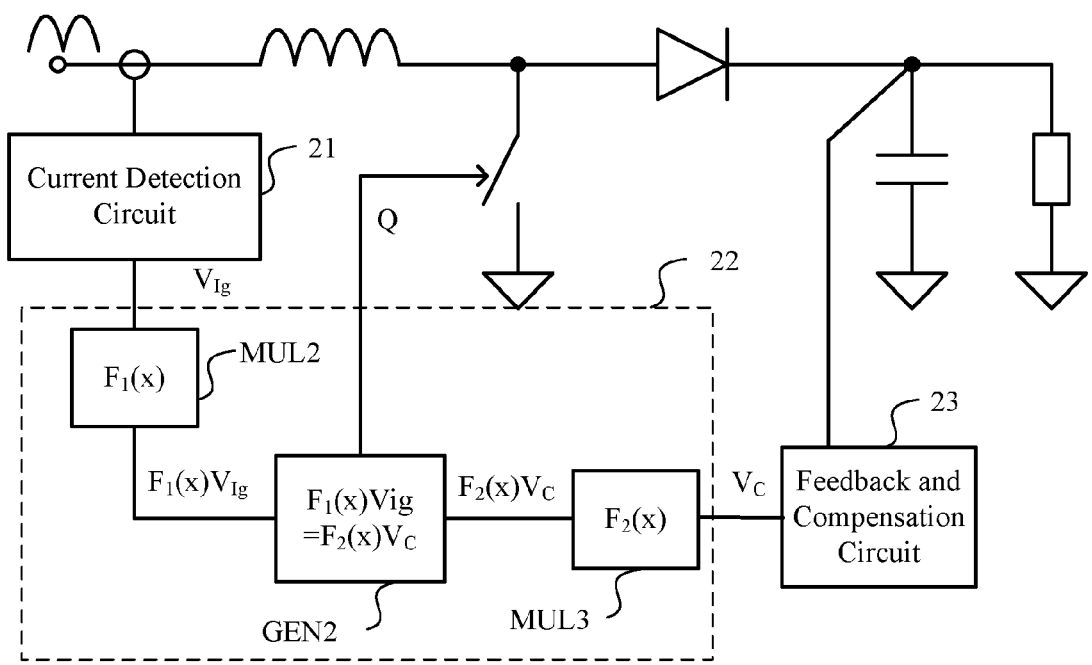
FIG. 9 is a schematic block diagram of an example power converter, in accordance with embodiments of the present invention.

Referring now to FIG. 9, shown is a schematic block diagram of an example power converter, in accordance with embodiments of the present invention. In this particular example, power stage circuit 1, current detection circuit 21, and feedback and compensation circuit 23 in control circuit 2 may have substantially the same structure as in the previous example. Control circuit 2 can include control signal generator 22, which can include multiplication circuits MUL2 and MUL3, and generate circuit GEN2. Multiplication circuit MUL2 can generate a second product signal that represents a product of conversion function $F_1(X)$ and current detection signal $V_{Ig}$.

Multiplication circuit MUL3 can generate a third product signal. The third product signal can represent a product of conversion function $F_2(X)$ and voltage compensation signal $V_C$. Generating circuit GEN2 can output the switching control signal such that product signal $F_1(X)*V_{Ig}$ is in direct proportion to product signal $F_2(X)*V_C$. The quotient $F_2(X)/F_1(X)$ of the second conversion function and the first conversion function can equal voltage conversion function $F(X)$. Since $F_1(X)*V_{Ig}$ is directly proportional to $F_2(X)*V_C$, $V_{Ig}$ can also be in direct proportion to $VC*F_2(X)/F_1(X)$, i.e., $V_{Ig}$ will be in direct proportion to $F(X)*V_C$. Thus, the PF value of the power converter can be 1, and constant voltage control and PFC control may accordingly be realized. Control signal generator 22 can be implemented by an analog circuit. For example, multiplication circuits MUL2 and MUL3 can generate the second product signal by controlling at least one switch according to the switching control signal.

Figure 10:
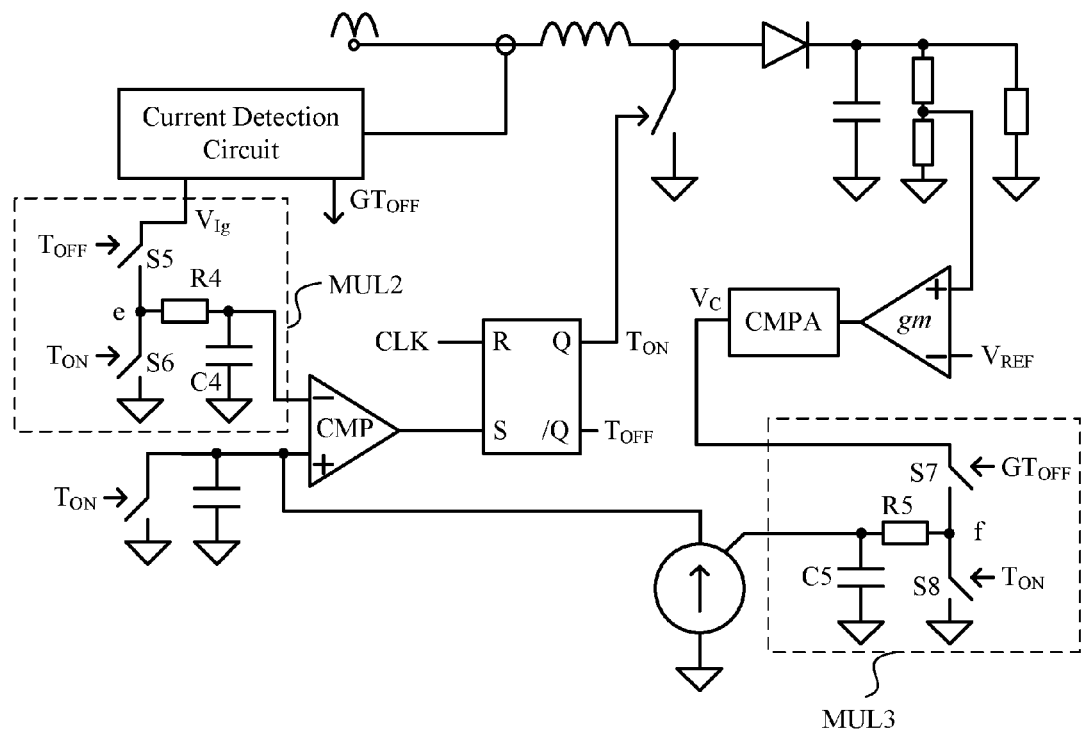
FIG. 10 is a schematic block diagram of an example power converter of FIG. 9, in accordance with embodiments of the present invention.

Referring now to FIG. 10, shown is a schematic block diagram of an example power converter of FIG. 9, in accordance with embodiments of the present invention. In this particular example, multiplication circuit MUL2 can include switches S5-S6, resistor R4, and capacitor C4. Switch S5 can be coupled between a current detection signal output terminal (e.g., an inverting input terminal of a comparator) and terminal e. Switch S6 may be coupled between the fifth terminal e and ground. Resistor R4 can be coupled between the fifth terminal e and a second product signal output terminal. Capacitor C4 may be coupled between the second product signal output terminal and ground. Switch S5 can be turned on during the off time of the switching control signal, and switch S6 is turned on during the on time of the switching control signal. The output signal of multiplication circuit MUL2 can be as shown below in (14).

$$V_{Ig} \cdot \frac{T_{off}}{T_{on} + T_{off}} \quad (14)$$

Product circuit MUL3 can include switches S7-S8, resistor R5, and capacitor C5. Switch S7 can be coupled between the voltage compensation signal output terminal and terminal f. Switch S8 may be coupled between terminal f and ground. Resistor R5 can be coupled between terminal f and the third product signal output terminal. Capacitor C5 is coupled between the third product signal output terminal and ground. Switch S7 may be turned on during time period $GT_{OFF}$ that may last from the moment that the switching control signal is switched to off state to the moment that the inductor current is decreased to zero. Switch S8 can be turned on during on time $T_{ON}$ of the switching control signal. Thus, the output signal of multiplication circuit MUL3 is:

$$V_C \cdot \frac{GT_{off}}{T_{on} + GT_{off}}.$$

Generating circuit GEN2 can output the switching control signal to maintain the second product signal has substantially in direct proportion to the third product signal. Also, control signal generator 22 can be implemented by a digital circuit to receive the second product signal, the third product signal and generate the switching control signal.

Figure 11:
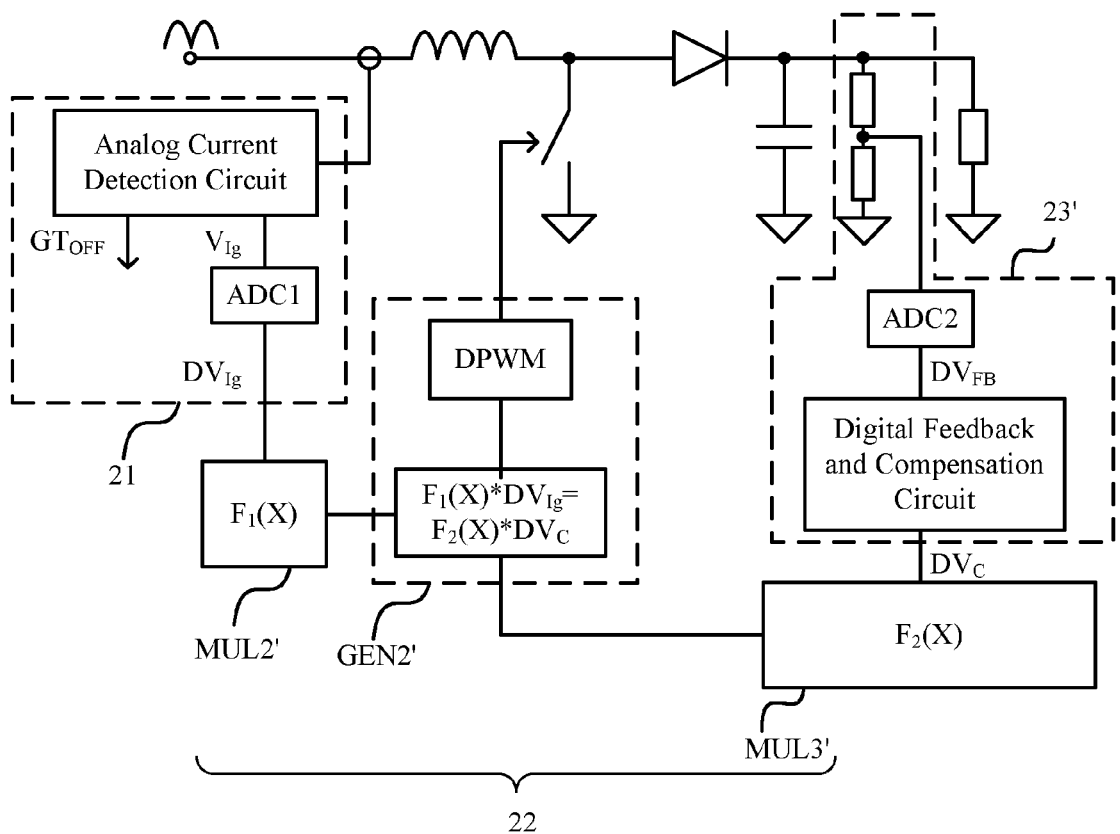
FIG. 11 is a schematic block diagram of another example power converter of FIG. 9, in accordance with embodiments of the present invention.

Referring now to FIG. 11, shown is a schematic block diagram of another example power converter of FIG. 9, in accordance with embodiments of the present invention. In this particular example, control circuit 2 can include current detection circuit 21, control signal generator 22, and feedback and compensation circuit 23. Current detection circuit 21 can include analog-to-digital conversion circuit ADC1 for converting current detection signal $V_{Ig}$ of analog form to digital signal $DV_{Ig}$. Feedback and compensation circuit 23 can include an analog-to-digital conversion circuit ADC2, for converting feedback voltage $V_{FB}$ obtained by dividing operation to digital signal $DV_{FB}$, and then output voltage compensation signal $DV_C$ of digital form through a digital error amplifier and a compensation circuit. Control signal generator 22 can include multiplication circuits MUL2' and MUL3', and a generating circuit GEN2'. Multiplication circuit MUL2' can output a second product signal by multiplying the current detection signal $DV_{Ig}$ by a coefficient $$\frac{T_{off}}{T_{on} + T_{off}}.$$

Multiplication circuit MUL3' can output a second product signal by multiplying the current detection signal $DV_{Ig}$ by a coefficient $$\frac{GT_{off}}{T_{on} + GT_{off}}.$$

Generating circuit GENT canreceive the second product signal and the third product signal of digital forms, and generate switching control signal Q such that the second product signal is equal to or proportional to the third product signal by digital pulse width modulation (DPWM). For example, multiplication circuits MUL2' and MUL3' and generating circuit GEN2' in control signal generator 22 can be dedicated digital logic circuits. Alternatively, control signal generator 22 can be a general digital signal process circuit, where multiplication circuits MUL2', MUL3 and generating circuit GEN2' can be implemented by executing corresponding programs or function modules by a general digital signal process circuit.

Figure 12:
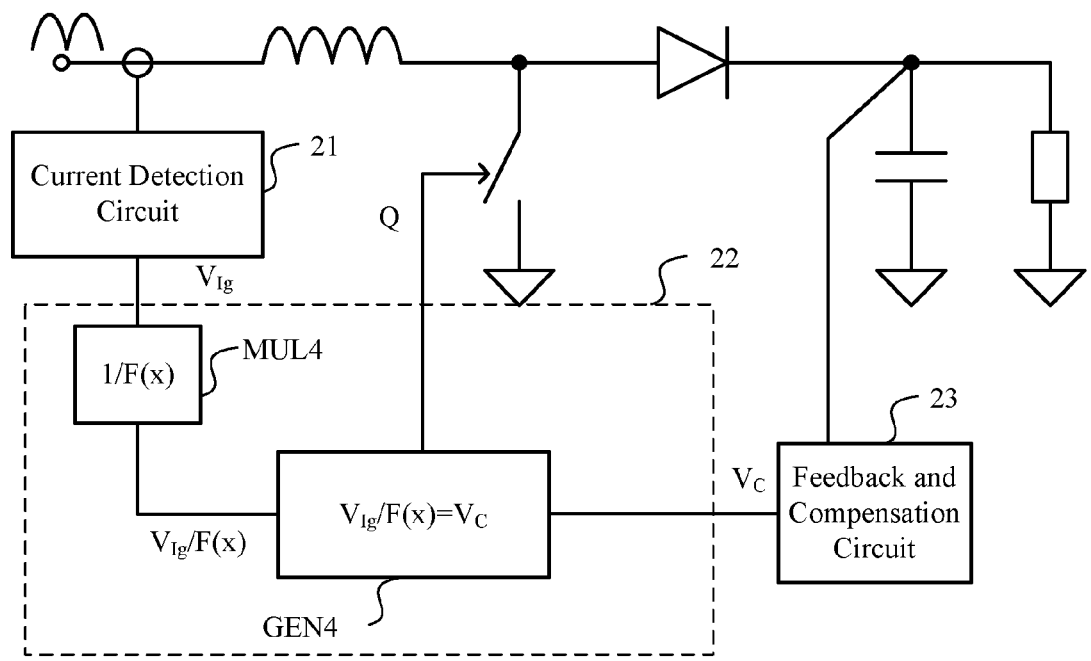
FIG. 12 is a schematic block diagram of yet another example power converter, in accordance with embodiments of the present invention.

Referring now to FIG. 12, shown is a schematic block diagram of yet another example power converter, in accordance with embodiments of the present invention. In this particular example, power stage circuit 1, current detection circuit 21, and feedback and compensation circuit 23 in control circuit 2 have the same structures as the previous example, thus it will be described herein anymore. Control circuit 2 can include control signal generator 22. Control signal generator 22 can include multiplication circuit MUL4 and a generating circuit GEN3. Multiplication circuit MUL4 can generate a fourth product signal that represents a product of a reciprocal of the voltage conversion function and current detection signal $V_{Ig}$. Generating circuit GEN3 can output the switching control signal to maintain product signal $V_{Ig}/F(X)$ as substantially equal to or in direct proportion to voltage compensation signal $V_C$.

Since $V_{Ig}/F(X)$ is directly proportional to $V_C$, $V_{Ig}$ may be in direct proportion to $F(X)*V_C$. Thus, the PF value of power converter is 1, and constant voltage control and PFC control may be realized. Control signal generator 22 can be implemented by an analog circuit. For example, multiplication circuit MUL4 can generate the second product signal by controlling at least one switch according to the switching control signal. Also, control signal generator 22 can be implemented by a digital circuit to receive the fourth product signal, and generate the switching control signal.

Figure 13:
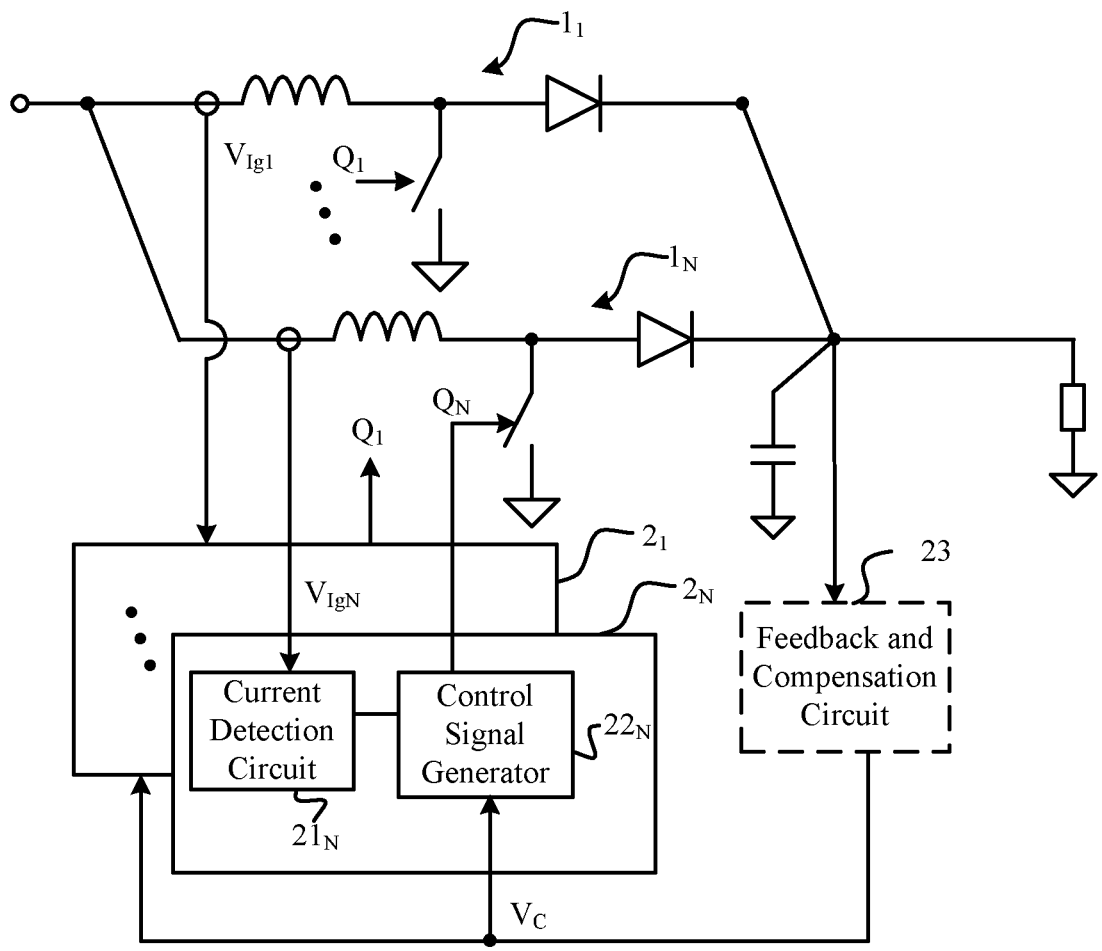
FIG. 13 is a schematic block diagram of still yet another example power converter, in accordance with embodiments of the present invention.

Referring now to FIG. 13, shown is a schematic block diagram of still yet another example power converter, in accordance with embodiments of the present invention. Different from the previous example, the power converter in this example can include N power stage circuits $1i$ coupled in parallel and corresponding to N control circuits $2_1$, i=1-N. For example, N power stage circuits can be coupled in parallel between the input terminal and the output terminal.

Each of the power stage circuits may have different input currents and the same output voltage, and all of the power stage circuits share one output capacitor. N control circuits can respectively control N power stage circuits. Each of the control circuits can include current detection circuit $21_i$ and control signal generator $22_i$, i=1-N. Current detection circuit 21i can detect the input current of a corresponding power stage circuit, and may generate current detection signal $V_{Ig}$, that represents the input current of the corresponding power stage circuit. Control signal generator 22, can generate switching control signal Q, to control a corresponding power stage circuit 1, such that the current detection signal is proportional to the voltage conversion function.

When all of the power stage circuits have same or substantially same circuit structures and parameters, the voltage conversion functions will also be same. The control circuit can make the input current of a corresponding power stage circuit be proportional to the voltage conversion function. Thus, for different control circuits, not only the PFC may be realized with a power factor value is approximately equal to 1, but also the current-sharing between different power stage circuits can be realized, and the input currents of different power stage circuits will be same. The multiphase power stage circuit of FIG. 13 may be utilized for power conversion, so as to reduce the power device burden, improve the power density, and reduce the output voltage ripple, as compared to other approaches.

The control circuit can include a voltage feedback loop whereby the control circuit can provide a voltage compensation signal based on the feedback and compensation circuit. Feedback and compensation circuits can be respectively provided in N control circuits $2_i$. Since the different power stage circuits may have same output voltages, N control circuits $2_i$ may share one feedback and compensation circuit 23. Therefore, the circuit size may be effectively reduced. In this way, particular embodiments can achieve good power factor correction results in different operation modes based on the same voltage conversion function for a power stage circuit of a fixed topology, such that the power converter may have a wider operation range. Particular embodiments may also be suitable for a wide variety of applications, such as multiphase power stage circuits or single-phase power stage circuits, fixed-frequency control methods or quasi-fixed frequency control methods, non-isolated power converter or isolated power converter, DC-DC converter or bridgeless AC-DC converter.

Figure 14:
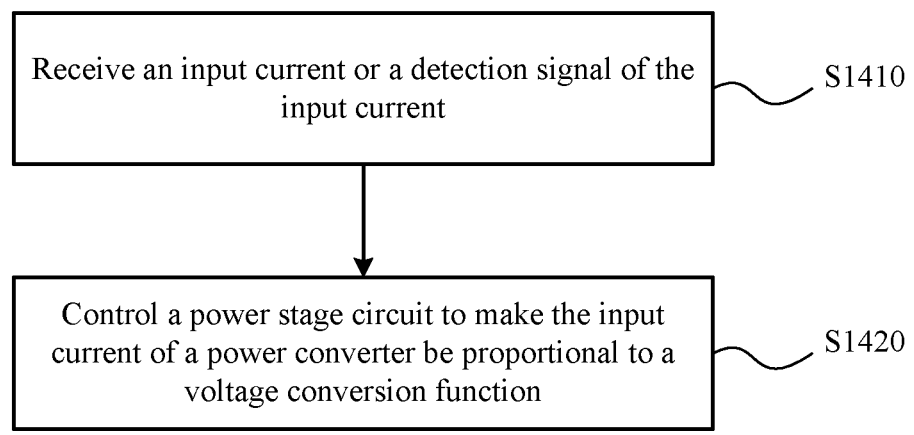
FIG. 14 is a flow diagram of an example control method for a power converter, in accordance with embodiments of the present invention.

Referring now to FIG. 14, shown is a flow diagram of an example control method for a power converter, in accordance with embodiments of the present invention. In this particular example, at 1410, an input current or a detection signal of the input current can be received. At 1420, a power stage circuit can be controlled such that the input current of the power converter is proportional to a voltage conversion function. For example, the voltage conversion function is a ratio of an input voltage and an output voltage of the power converter, and the voltage conversion function changes along with an switching control signal. For example, the voltage conversion function can change according to the topology of the power stage circuit of the power converter. For example, controlling the power stage circuit such that an input current of the power converter is proportional to the voltage conversion function can include generating the switching control signal such that a current detection signal is directly proportional to a product of the voltage conversion function and the voltage compensation signal, and the current detection signal may represent the input current.

The input current can be proportional to the voltage conversion function that represents a ratio of an input voltage and an output voltage by adjusting the input current. In this way, the power converter may be equivalent to a pure resistance, such that the PF value is maintained as 1 or close to 1 in different operation modes, which is conducive to power expansion. Particular embodiments may also be suitable for being controlled by fixed-frequency or quasi-fixed frequency control schemes, and for a single-phase power stage circuit or a multiphase power stage circuit, thus providing wide applicability, and more compact circuit structures without sampling an input voltage.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a power converter, the control circuit comprising:
    a) a current detection circuit configured to generate a current detection signal that represents an input current;
    b) a control signal generator configured to generate a switching control signal such that said current detection signal is directly proportional to a voltage conversion function, wherein said control signal generator is configured to select a corresponding voltage conversion function according to the topology of said power converter; and
    c) a power stage circuit of said power converter being controlled by said switching control signal, wherein said voltage conversion function is a ratio of an input voltage and an output voltage of said power converter.

2. The control circuit of claim 1, wherein said voltage conversion function is a function of parameters of said switching control signal.

3. The control circuit of claim 1, further comprising:
    a) a feedback and compensation circuit configured to generate a voltage compensation signal that represents an error between said output voltage and a reference voltage; and
    b) said control signal generator being configured to generate said switching control signal such that said current detection signal is directly proportional to a product of said voltage conversion function and said voltage compensation signal.

4. The control circuit of claim 3, wherein said control signal generator comprises:
    a) a first multiplication circuit configured to generate a first product signal that represents said product of said voltage conversion function and said voltage compensation signal; and
    b) a first generator configured to generate said switching control signal, and to maintain said first product signal as directly proportional to said current detection signal.

5. The control circuit of claim 4, wherein said first multiplication circuit is configured to generate a first product signal by controlling at least one switch according to said switching control signal.

6. The control circuit of claim 5, wherein said first multiplication circuit comprises:
    a) a first switch coupled between a voltage compensation signal output terminal and a first terminal, wherein said first switch is on during a period from the moment that said switching control signal is deactivated to the moment that an inductor current is decreases to zero;
b) a second switch coupled between said first terminal and ground;
c) a first resistor coupled between said first terminal and a second terminal;
d) a first capacitor coupled between said second terminal and said ground;
e) a first operational amplifier having a non-inverting input terminal coupled to said second terminal, and an inverting input terminal coupled to a third terminal;
f) a third switch coupled between an output terminal of said first operational amplifier and a fourth terminal, wherein said third switch is on when said switching control signal is deactivated;
g) a fourth switch coupled between said fourth terminal and said ground, wherein said second and fourth switches are on when said switching control signal is activated;
h) a second resistor coupled between said third terminal and said fourth terminal;
i) a second capacitor coupled between said third terminal and said ground;
j) a third resistor coupled between said output terminal of first operational amplifier and a first product signal output terminal; and
k) a third capacitor coupled between said first product signal output terminal and said ground.

7. The control circuit of claim 3, wherein said control signal generator comprises:
a) a second multiplication circuit configured to generate a second product signal that represents a product of a first conversion function and said current detection signal;
b) a third multiplication circuit configured to generate a third product signal that represents a product of a second conversion function and said voltage compensation signal; and
c) a second generator configured to generate said switching control signal to maintain said second product signal as directly proportional to said third product signal, wherein a quotient of said first and second conversion functions equal said voltage conversion function.

8. The control circuit of claim 7, wherein:
a) said second multiplication circuit is configured to generate a second product signal by controlling at least one switch according to said switching control signal; and
b) said third multiplication circuit is configured to generate a third product signal by controlling at least one switch according to said switching control signal.

9. The control circuit of claim 8, wherein said second multiplication circuit comprises:
a) a fifth switch coupled between a current detection signal output terminal and a fifth terminal, wherein said fifth switch is on when said switching control signal is deactivated;
b) a sixth switch coupled between said fifth terminal and said ground, wherein said sixth switch is on when said switching control signal is activated;
c) a fourth resistor coupled between said fifth terminal and a second product signal output terminal; and
d) a fourth capacitor coupled between said second product signal output terminal and said ground.

10. The control circuit of claim 8, wherein said third multiplication circuit comprises:

a) a seventh switch coupled between said voltage compensation signal output terminal and a sixth terminal, wherein said seventh switch is on during a period from a moment that said switching control signal is deactivated to a moment that said inductor current decreases to zero;
b) an eighth switch coupled between said sixth terminal and said ground, wherein said eighth switch is on when said switching control signal is activated;
c) a fifth resistor coupled between said sixth terminal and a third product signal output terminal; and
d) a fifth capacitor coupled between said third product signal output terminal and said ground.

11. The control circuit of claim 3, wherein said control signal generator comprises:
a) a fourth multiplication circuit configured to generate a fourth product signal that represents a product of a reciprocal of said voltage conversion function and said current detection signal; and
b) a third generator configured to generate said switching control signal to maintain said fourth product signal as directly proportional to said voltage compensation signal.

12. The control circuit of claim 7, wherein said fourth multiplication circuit is configured to generate said fourth product signal by controlling at least one switch according to said switching control signal.

13. The control circuit of claim 3, wherein:
a) said current detection signal and said voltage compensation signal are digital signals; and
b) said control signal generator comprises a digital signal process circuit.

14. The control circuit of claim 1, wherein said control signal generator is configured to receive a clock signal to control said switching control signal.

15. The control circuit of claim 1, wherein:
a) said control circuit comprises a quasi-fixed frequency signal generator for generating a quasi-fixed frequency signal in a time period; and
b) said control signal generator is configured to control said switching control signal based on said quasi-fixed frequency signal.

16. A method of controlling a power converter, the method comprising:
a) generating, by a current detection circuit, a current detection signal that represents an input current;
b) generating, by a control signal generator, a switching control signal such that said current detection signal is directly proportional to a voltage conversion function; and
c) controlling, by said switching control signal, a power stage circuit of said power converter, wherein said voltage conversion function is a ratio of an input voltage and an output voltage of said power converter, and wherein said voltage conversion function changes according to the topology of said power stage circuit.

17. The method of claim 16, wherein said voltage conversion function changes along with a switching control signal.

18. The method of claim 16, further comprising generating, by a feedback and compensation circuit, a voltage compensation signal that represents an error between said output voltage and a reference voltage.

19. The method of claim 18, further comprising generating, by said control signal generator, said switching control signal such that said current detection signal is directly proportional to a product of said voltage conversion function and said voltage compensation signal.

20. The method of claim 19, further comprising:
a) generating, by a multiplication circuit, a product signal that represents said product of said voltage conversion function and said voltage compensation signal; and
b) maintaining said product signal as directly proportional to said current detection signal.

* * * * *